Jan. 2, 1968   J. NELSON ET AL   3,361,163
ROTARY VALVE

Filed Sept. 23, 1965   2 Sheets-Sheet 1

INVENTORS
JOHN NELSON
JAMES A. SHEPHARD
BY
ATTORNEYS

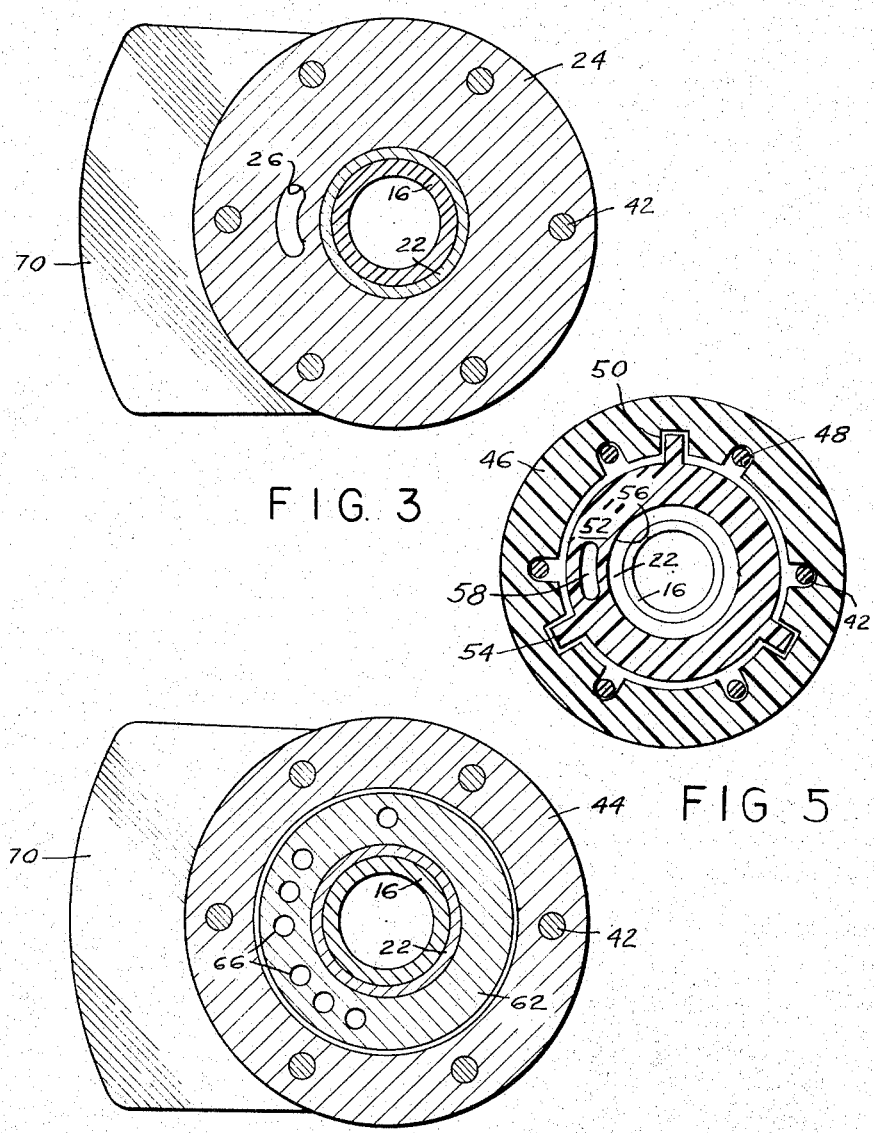

United States Patent Office 3,361,163
Patented Jan. 2, 1968

3,361,163
ROTARY VALVE
John Nelson, North Kingstown, and James A. Shephard, Wickford, R.I., assignors to Leesona Corporation, Warwick, R.I., a corporation of Massachusetts
Filed Sept. 23, 1965, Ser. No. 489,497
6 Claims. (Cl. 137—625.11)

ABSTRACT OF THE DISCLOSURE

A rotary valve having a diaphragm secured to a stationary body of the valve and mounted for flexing movement between the stationary body and a rotary valve member.

---

This invention relates generally to rotary valve mechanisms for sequentially directing an operating fluid into a plurality of passages and, more particularly, relates to an improved rotary valve mechanism having a novel sealing means.

In many pneumatically operated mechanisms it is necessary to sequentially direct air or other fluid under pressure to a plurality of parts or components. The present invention provides a simple, highly efficient, easily operated and economical rotary valve for use with such mechanisms.

Accordingly, it is an object of the present invention to provide a novel rotary valve permitting greater ease of rotation between the elements thereof.

A further object is to provide a rotary valve having efficient sealing means.

A further object is the provision of a rotary valve employing a novel sealing means of two piece, interlocking construction wherein a gasket is held fixed and a diaphragm of smaller cross-section cooperating within the confines of the gasket is held fixed against rotation but is movable axially.

Other and further objects and advantages will become more apparent upon a closer reading of the specification together with the accompanying drawings in which like numbers refer to like elements thereof.

FIG. 3 is a view in section taken along lines 3—3 of FIG. 2 and generally illustrates the shape of the inlet passage closely adjacent to the plane of intersection between the stationary and rotatable elements;

FIG. 4 is a view in section taken along lines 4—4 of FIG. 2 and primarily illustrating the plurality of outlet passage; and FIG. 5 is a view taken along lines 5—5 of FIG. 2 illustrative of the cooperating diaphragms employed in the rotary valve.

The novel design incorporated into the rotary valve mechanism to be described resides primarily in the provision of the unique fluid seal and diaphragm construction. Briefly, the rotary valve consists of a stationary member having an inlet passage formed therein to receive fluid under high pressure from a suitable source. A second member is rotatably mounted on the stationary member and has a plurality of outlet passages formed therein which are communicable one by one with the inlet passage upon rotation of the second member. A gasket is fixed to the stationary member and has notches formed at a plurality of generally equally spaced points along its inner circumference. An annular diaphragm is located between the members of the rotary valve and being of smaller cross-section than the gasket is axially movable within defined limits. A plurality of radially extending fingers are formed around the outer periphery of the diaphragm. These fingers are slightly smaller in size than the notches formed in the gasket and are received within these notches. Thus, while the diaphragm is permitted limited axial movement, it is restrained against rotational movement by the gasket. Also formed in the diaphragm is a hole similar in shape to the inlet passage where it intersects the wall of the stationary member adjacent the diaphragm. However, the hole in the diaphragm is slightly smaller than the exit passage so as to form a lip around the periphery of said passage. By so doing, the pressurized fluid from the inlet passage impinges on the lip of the diaphragm forcing it against the rotatable member and permitting the flow of fluid only on the upper surface of the diaphragm and into the properly aligned outlet passage or passages. Roller-thrust and journal bearings are interposed between the stationary and rotatable members to provide the highly accurate seating required between said members as well as for facility of rotation. Because the pressure of the fluid impinges only on the lip portion of the diaphragm and not across its entire annular area, it will be appreciated that the torque required to rotate the valve is considerably less than it would be otherwise. Further, since the diaphragm is capable of moving axially, an efficient, fluid-tight seal between the stationary and rotatable members is insured. If, for example, the surface of the rotatable member adjacent the stationary member should be uneven, i.e., not absolutely parallel to the adjoining surface of the stationary member, the diaphragm can be shifted axially to continue to conform to the uneven rotatable member.

Figure 1:
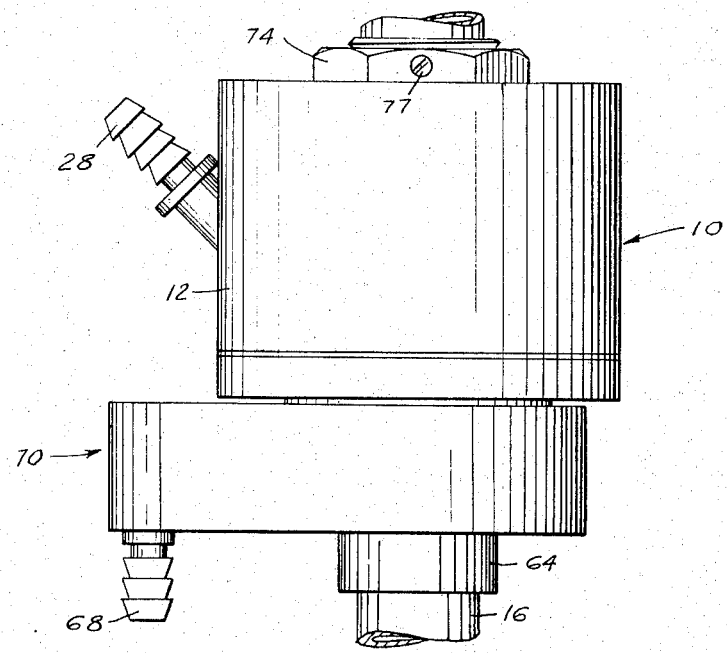
FIG. 1 is an elevation view illustrating the rotary valve of the instant invention mounted on a shaft and provided with a manifold.
Figure 2:
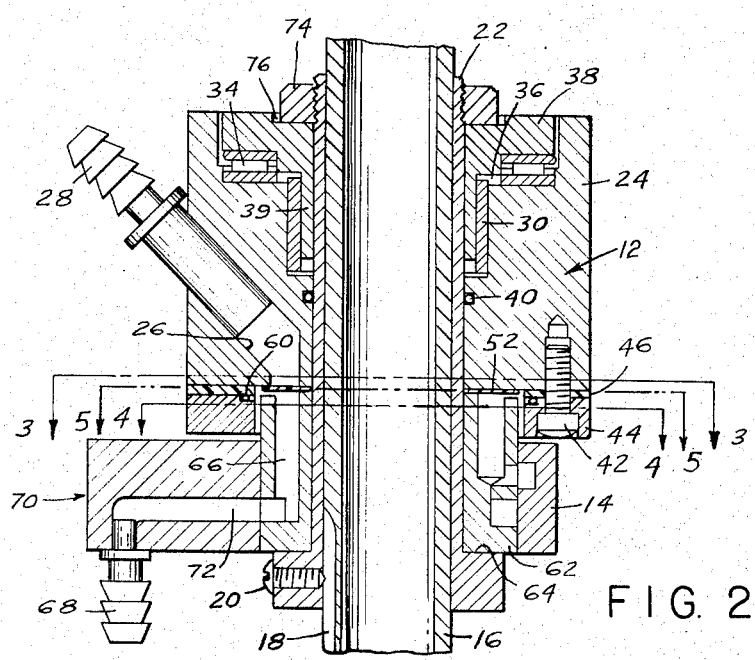
FIG. 2 is a view similar to FIG. 1 except that it is generally in section in order to illustrate the internal structure of the rotary valve.

Referring now to the drawings and, firstly, particularly to FIGS. 1 and 2, the rotary air valve 10 consists of stationary element 12 and rotatable element 14. It will be appreciated that shaft 16 is not a part of the valve per se but, rather, is shown as a typical mounting means for the valve. A set screw 20 is threadedly received in a sleeve 22 and serves to hold the sleeve fast to shaft 16.

Stationary member 12 consists of housing 24 having an inlet passage 26 formed therein. Fluid receiving fitting 28 is held in frictional engagement within passage 26 and extends outward beyond the periphery of housing 24. A journal bearing 30 of brass, bronze, or other suitable bearing material is mounted in a recess of housing 24 concentric with hollow rotatable shaft 16. One annular race of a roller thrust bearing 34 is supported on recessed shoulder 36 of the stationary housing, while the other annular race of bearing 34 is in frictional engagement with cap 38 whose lower extension 39 is in engagement with journal bearing 30.

An O-ring seal 40 is mounted in an annular recess of housing 24 adjacent sleeve 22 to prevent leakage of air from inlet passage 26 between housing 24 and sleeve 22. A retaining ring 44 is secured by means of screws 42 to housing 24 and acts to fix a gasket 46 to stationary housing 24. Gasket 46 may be of nylon or any other durable, extensible material. The outer circumference of gasket 46 is generally circular in shape, (see FIG. 5) and conforms to the outer wall of periphery of housing 24. The inner circumference of gasket 46 is broken by semi-circular cutouts 48 to pass mounting screws 42 therethrough. Further, a plurality of recesses 50 are formed in the inner circumference of gasket 46. A diaphragm 52 which, like gasket 46, may be of nylon or any other durable, extensible material, cooperates with outer gasket 46 and to this end is generally circular in shape. Furthermore, the outer circumference of diaphragm 52 is just slightly smaller than that of the inner circumference of gasket 46. A plurality of fingers 54 which extend radially from the outer circumference of the diaphragm 52 into recesses 50 are slightly smaller than the recesses into which they extend. Also formed in diaphragm 52 is a centrally disposed, generally circular hole 56 through which passes sleeve 22. An arcuate or kidney-shaped hole 58 is provided through diaphragm 52. Hole 58 desirably conforms to the shape of passage 26, but, as seen in FIG. 2, hole 58 is slightly smaller around its entire periphery than said passage with which is cooperates. As best seen in FIG. 2, the thickness of the diaphragm 52 is substantially less than that of gasket 46. Hence, a clearance is provided thereby so that diaphragm 52 can "float" or move axially of shaft 16 within the confines of gasket 46 for a limited distance.

An O-ring 60 is seated in a suitable annular recess formed on the upper surface of retaining ring 44. O-ring 60 engages the shoulders of gasket 46 which lie adjacent to and form the boundaries of recesses 50, and is communicable with the fingers 54 of diaphragm 52. While serving cooperatively with gasket 46 to prevent the escape of fluid from the valve, the O-ring does not impede the floating action of diaphragm 52.

Rotatable member 14 is bored through to receive the lower section of sleeve 22. The upper end of sleeve 22 has cap 38 slidably supported thereon. An annulus 62 is fitted slidably on the lower end of sleeve 22. Further, the lower end of sleeve 22 is enlarged to provide a shoulder 64 which engages with and serves to draw annulus 62 upward toward the lower wall of housing 24. The uppermost end of annulus 62 acts as one terminus or boundary for the movement of floating diaphragm 52, the other terminus being the base or lower wall of housing 24.

A plurality of outlet passages 66 (see FIG. 4) are formed in annulus 62 at radial distances from the center of the valve and are spaced apart at varying distances for a reason to be explained. Each of the outer passages 66 may communicate with its own exit fitting 68 which is frictionally held within housing 70. In turn, housing 70 is connected to annulus 62 of the valve by a press-fit. An exit passage 72 connects each passage 66 to its associated fitting 68.

A retaining nut 74 is internally threaded and is received on threads tapped adjacent the upper end of sleeve 22. When said retaining nut 74 is tightened down onto recess 76 formed in cap 38, the main elements of valve 10 are securely held together between cap 38 and shoulder 64 of sleeve 22 thereby constituting the valve as an integral one-piece unit. Nut 74 also serves to adjust the clearance of the cavity afforded between annulus 62 and housing 24 for axial movement of diaphragm 52. A set screw 77 serves to lock nut 74 in place on sleeve 22. Thus, it will be seen that as shaft 16 is rotated, nut 74, sleeve 22, cap 38, annulus 62, housing 70 and the support bearings for these elements will also rotate. It will be understood that as annulus 62 rotates, the various outlet passages 66 may be indexed sequentially, one by one, into register with inlet passage 26 of fixed housing 24. The spacing of the passages 66 is determined by the time sequence desired for whatever operations are to be performed by the fluid as the valve is rotated.

In the operation of valve 10, it will be appreciated that because kidney-shaped hole 58 formed in diaphragm 52 is slightly smaller around its entire periphery than passage 26, air impinges on the lip thereby formed to force the diaphragm into seating contact with the upper surface of annulus 62 (FIG. 2). Although pressurized air is introduced to the upper surface of diaphragm 52, the friction induced by the contact of said diaphragm on the smooth upper surface of annulus 62 is negligible compared to the "dimpling effect" of the diaphragm on the cavities of the several outlet passages 66. The term "dimpling effect" refers to the phenomenon according to which the pressure across the upper surface of diaphragm 52 urges same to engage the periphery of each of the outlet cavities and to depend therewithin a very slight distance. However, even the friction induced by the so-called dimpling effect is considerably less than was the case in rotary valves of the prior art.

The rotary valve 10 is easily assembled, requiring no time-consuming, trial and error, hand manipulation of the gasket 46, diaphragm 52, and the valve housings as was necessary with conventional sealing devices. Thrust bearing 34 assures squareness between stationary element 12 and rotatable element 14 of the rotary valve. With particular reference to FIG. 2, it is seen that pressurized air entering through passage 26 presses the lip of diaphragm 52 around hole 58 into contact on the upper surface of annulus 62 as the air passes into the cavity formed between the lower surface of housing 24 and the upper surface of diaphragm 52. The force of the air acting downward against annulus 62 is transmitted through sleeve 22, retaining nut 74, cap 38, and roller thrust bearing 34 to housing 24. Therefore, even when passage 26 is charged with maximum operating air pressure, squareness between element 12 and element 14 of valve 10 is assured by thrust bearing 34 while yet assuring rotatability therebetween.

During rotation of shaft 16 and valve member 14 fixed thereto, it will be appreciated that only diaphragm 52 is in frictional engagement with the upper surface of the rotating annulus 62. Thus, the primary mechanical opposition to rotation, arising by virtue of the rotary valve 10 being carried on shaft 16, is the result of the dimpling effect discussed earlier. The relatively small force required to rotate the valve disclosed herein is in distinct contrast to that required to operate conventional rotary valves employing a single seal for the dual purposes of sealing the unit against loss of fluid and directing fluid to the proper outlet conduit. Further, as annulus 62 rotates, diaphragm 52 is free to shift axially of shaft 16. Thus, if the upper face or wall of annulus 62 is uneven, diaphragm 52 will simply rise and fall axially of shaft 16 conforming always to the upper face of said annulus.

It will be apparent that many modifications and other embodiments may be made according to this invention without departing from the scope thereof and it is therefore to be understood that the invention is not to be limited by the particular illustrated embodiment, but only by the scope of the appended claims.

What is claimed is:

1. A rotary valve comprising, first and second members, means connecting said members together for relative rotation about an axis, each of said members having a fluid passage therein, said passages being eccentric to said axis and registering with each other in one position of said members to pass fluid therebetween and being out of register in another position, a diaphragm positioned in a zone between said members for flexing movement between said members and having an aperture therein aligned with the passage in said first member to permit flow of pressurized fluid between said passages when said passages are in register, said diaphragm sealing the passage in said second member against the flow of fluid between said passages when said passages are out of register.

2. The combination as set forth in claim 1 including means for adjusting the size of said zone between said first and second members.

3. The combination as set forth in claim 1 including restraining means for preventing rotation of said diaphragm during relative rotation between said first and said second members.

4. A rotary valve comprising, a stationary member having a first fluid passage therethrough, a movable member having a second fluid passage therethrough, holding means for securing said stationary member and said movable member together for movement of said passages into and out of registry with each other, means for rotating said holding means to rotate said movable member relative to said stationary member, a diaphragm mounted on said holding means in a zone between said stationary member and said movable member for flexing movement between said members, said diaphragm having at least one aperture therein aligned with said first passage to permit flow of pressurized fluid between said first and said second fluid passages when said passages are in register, said diaphragm sealing said second passage against the flow of fluid between said first and said second passages when said first and second passages are out of register.

5. The combination as set forth in claim 4 including means for adjusting the size of said zone between said first and said second members.

6. The combination as set forth in claim 4 including restraining means for preventing rotation of said diaphragm during relative rotation between said first and said second members.

References Cited

UNITED STATES PATENTS

| | | | |
|---|---|---|---|
| 2,247,227 | 6/1941 | Findley | 251—208 |
| 2,369,522 | 2/1945 | Bazille | 251—208 |
| 2,531,480 | 11/1950 | Sparklin et al. | 251—208 |
| 3,096,786 | 7/1963 | Rost | 251—172 |
| 3,188,097 | 6/1965 | Cott | 277—74 |

M. CARY NELSON, *Primary Examiner.*

W. R. CLINE, *Assistant Examiner.*